United States Patent [19]

Assus et al.

[11] Patent Number: 4,750,827

[45] Date of Patent: Jun. 14, 1988

[54] PROCESSES FOR MANUFACTURING SUBSTRATES OF MIRRORS MADE OF RESIN CONCRETE AND CORRESPONDING MIRRORS

[75] Inventors: Pierre G. Assus, Juan-les-Pins; Audre M. Glentzlin, Grasse, both of France

[73] Assignee: Centre National de la Recherche Scientifique - C.N.R.S., Paris, France

[21] Appl. No.: 899,229

[22] PCT Filed: Jan. 24, 1986

[86] PCT No.: PCT/FR86/00023

§ 371 Date: Jul. 30, 1986

§ 102(e) Date: Jul. 30, 1986

[87] PCT Pub. No.: WO86/04297

PCT Pub. Date: Jul. 31, 1986

[30] Foreign Application Priority Data

Jan. 25, 1985 [FR] France ................. 85 01166

[51] Int. Cl.⁴ .................. G02B 5/10; G02B 7/18; B29D 11/00; B05D 5/06
[52] U.S. Cl. .................. 350/641; 264/1.9; 264/2.5; 264/130; 264/226; 427/162
[58] Field of Search ......... 264/2.5, 1.9, 1.7, 130, 264/226; 350/631, 628, 641, 600; 425/808, DIG. 122; 427/162

[56] References Cited

U.S. PATENT DOCUMENTS

| | | | |
|---|---|---|---|
| 2,444,532 | 7/1948 | Richardson | 264/1.9 |
| 2,444,533 | 7/1948 | Richardson | 264/1.9 |
| 3,225,123 | 12/1965 | Wiswell | 264/1.9 |
| 3,274,301 | 9/1966 | Kulp, Jr. | 264/2.1 |
| 3,428,533 | 2/1969 | Pichel | 264/2.5 |
| 4,061,518 | 12/1977 | Burroughs et al. | 264/1.9 |
| 4,116,753 | 9/1978 | Tojyo et al. | 264/2.5 |
| 4,188,358 | 2/1980 | Withoos et al. | 264/1.9 |
| 4,241,126 | 12/1980 | Nicolat et al. | 264/1.7 |
| 4,255,364 | 3/1981 | Talbert | 264/1.9 |

FOREIGN PATENT DOCUMENTS

80/02684 12/1980 World Int. Prop. O. ......... 264/1.9

*Primary Examiner*—James Lowe
*Attorney, Agent, or Firm*—Balogh, Osann, Kramer, Dvorak, Genova & Traub

[57] ABSTRACT

Processes for manufacturing substrates of mirrors of resin concrete and the corresponding mirrors. A process for manufacturing a mirror substrate including the following operations: (1) a mould is manufactured of which the bottom has a polished upper face, complementary of the reflecting face to be made; (2) the polished face is coated with a film of a demoulding product and a hard, uniform layer is deposited; and (3) a resin concrete is cast into the mould and it is left to harden and then demoulding is effected in order to obtain a substrate of resin concrete. This process is used in the mass-production of substrates of mirrors and of mirrors of astronomical quality.

3 Claims, 2 Drawing Sheets

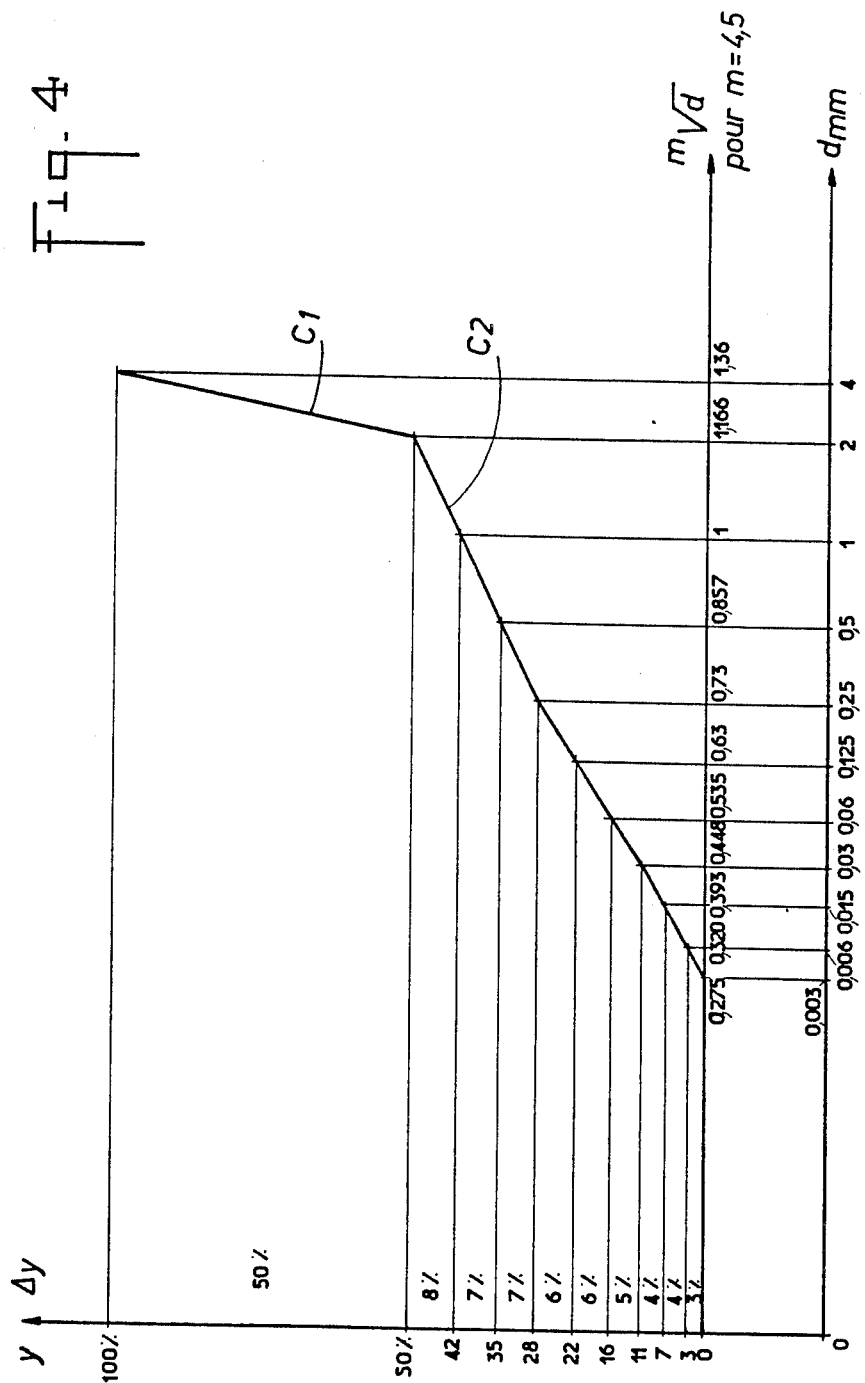

PROCESSES FOR MANUFACTURING SUBSTRATES OF MIRRORS MADE OF RESIN CONCRETE AND CORRESPONDING MIRRORS

BACKGROUND OF THE INVENTION

1. Field of the Invention

The present invention has for its object processes for manufacturing mirror substrates made of resin concrete and the mirrors obtained by these processes.

The technical sector of the invention is that of the manufacture of mirrors.

2. Description of the Prior Art

Traditionally, mirrors are manufactured from a block of glass of which one face is machined and polished with very high precision along a determined geometrical surface which may be plane, spherical, parabolic or any other convex or concave geometrical shape.

The quality of the images depends on the variations between the real reflecting surface and a theoretical geometrical surface.

A so-called $\lambda/10$ quality astronomical mirror must present a reflecting face of which the variations with respect to the theoretical geometrical surface are in all points less than one tenth of the average wave-length of the visible radiations to be reflected.

The works for manufacturing and polishing a traditional $\lambda/10$ quality glass mirror with a diameter of 0.5 m, last about a month and a half and the cost of such a mirror is included between 50,000 and 100,000 francs. The manufacture of a conventional astronomical $\lambda/10$ quality mirror having a diameter of 1.50 m lasts about six months and the cost is included between 800,000 francs and 1.6 million francs.

In order to reduce the costs and durations of manufacture, it has been sought to manufacture mirrors by so-called surface replication processes consisting in making a glass mould of which one face is polished with very high precision along a conjugate surface or one complementary of the reflecting face to be made, and in casting into this mould a layer of polymerizable resin of which the face placed in contact with the polished face of the mould is perfectly smooth and reproduces the impression thereof.

The outer face of the layer of resin is then coated with a reflecting layer. The reflecting layer may be deposited on the polished face of the mould before the layer of resin is applied thereon in accordance with the technique described in Pat. No. FR. 1.187.363 (F. SCHWARTZ-KINO).

This so-called surface replication technique makes it possible to use the same mould a very large number of times in order to manufacture series of identical mirrors, but it must be avoided that the polished face of the mould be deformed or scratched.

Moreover, in order to manufacture large aperture mirrors of astronomical quality by this technique, the layer of resin must be supported by a rigid, undeformable substrate and manufacture of this substrate must not involve high costs in order that the cost of manufacturing the mirrors is less high than that of conventional mirrors.

SUMMARY OF THE INVENTION

The object of the present invention is to provide means for manufacturing mirrors of astronomical quality or other equally precise geometrical surfaces, particularly series of identical mirrors, from the same mould having a polished surface which is a conjugate surface of the reflecting face of the mirrors of which an impression is taken in polymerizable resin, by associating this impression with a rigid, undeformable substrate which may itself be cast in a mould and which presents a very good adherence with the layer of resin which constitutes the reflecting geometrical face of the mirror.

This object is attained by means of a process for manufacturing a mirror substrate which comprises the succession of following operations:

a mould is manufactured of which the bottom has a polished upper face, complementary of the reflecting face to be made;

the polished face is coated with a film of an anti-adhesive product intended to facilitate demoulding;

a hard, thin, uniform layer is deposited on the film;

a resin concrete is cast into the mould, forming a substrate;

it is left to harden and the substrate is demoulded.

Once the resin concrete substrate is manufactured, a mirror of astronomical quality is manufactured by a process of surface replication consisting in completing the substrate by a layer of resin which is disposed in contact with the outer face of the substrate, i.e. the face which was in contact with the polished face of the bottom of the mould and a reflecting film is deposited on this layer of resin.

According to a preferred embodiment, the phase of surface replication comprises the following operations:

a substrate of resin concrete is firstly manufactured;

a mould is manufactured, having a polished face complementary of the reflecting face of the mirror to be made;

the polished face is coated with a film of an anti-adhesive product intended to facilitate demoulding;

a layer of liquid polymerizable resin is deposited on the film;

there is applied on the layer of resin, before it has solidifed, the face of the resin concrete substate which was in contact with the hard layer;

the resin is left to harden;

demoulding is effected;

and a reflecting film is applied on the outer face of the layer of resin.

According to one feature of the invention, the granulometric distribution of the aggregates of the resin concrete serving to manufacture the substrate is as follows:

about half of the weight of the aggregates is composed of aggregates of the higher granulometric class of which the upper limit is defined by a mesh width which is of the order of one tenth of the smallest dimension of the mirror to be made and of which the lower limit is defined by a mesh width equal to half the upper limit;

the other half of the weight of the aggregates is composed of aggregates which are distributed in about ten granulometric classes of which the upper and lower limits are defined by mesh dimensions in a geometrical progression of ratio two and the proportion by weight of aggregates y expressed in percentage of the total weight of aggregates, which passes through a sieve having a mesh opening $d$, varies in accordance with a law of the form $y = k^m\sqrt{d}$ in which k is a constant coefficient and m a constant included between 3 and 6.

The invention has for its result novel substrates of mirrors made of resin concrete and mirrors of astronomical quality comprising these substrates.

The processes according to the invention make it possible to manufacture large-aperture mirrors of astronomical quality in a much shorter time and for a price clearly less than that of conventional glass mirrors.

They make it possible to produce series of identical mirrors from the same mould.

Trails carried out have shown that the mirrors obtained by the processes according to the invention have local defects of very small amplitude having depths included between 0.1 nm and 10 nm, over areas of some millimeters, this giving a diffusion spot of the image of a source point located at infinity having an aperture of the order of 1 second.

Measurements have been made on a plane mirror made by a process according to the invention having an aperture of 300 mm. These measurements have shown that the reflecting surface of this mirror remained included between two planes of which the distance is less than $\lambda/10$.

BRIEF DESCRIPTION OF THE DRAWINGS

The following description refers to the accompanying drawings which represent, without any limiting character, several successive steps of manufacture of a mirror replica by a process according to the invention.

FIG. 4 is a graph representing the curve of granulometric distribution of the aggregates of the resin concrete used for manufacturing a mirror substrate according to the invention.

DESCRIPTION OF THE PREFERRED EMBODIMENTS

Figure 1:
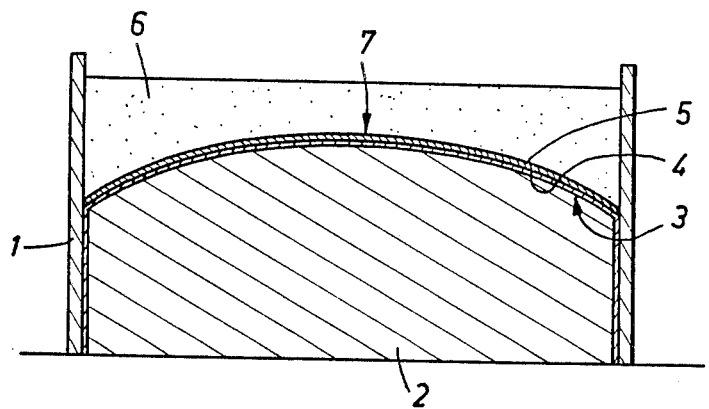
FIG. 1 is an axial section showing the step of manufacturing the substrate of resin concrete of a concave mirror.

FIG. 1 shows a mould 1 for manufacturing several substrates of identical concave mirrors, of astronomical, so-called $\lambda/10$ quality.

The bottom of the mould 2 comprises an upper face 3 which is a very precise geometrical replica, so-called conjugate or complementary of the reflecting surface of the mirror. If the mirrors to be manufactured are concave, the upper face of the mould 1 is convex and vice versa.

The bottom of the mould 2 is for example made of glass and face 3 is polished with high precision in accordance with the conventional mirror manufacturing technique.

The process according to the invention makes it possible to manufacture successively several identical mirror substrates of astronomical quality using the same mould bottom 2.

Face 3 of the mould is first coated uniformly with a film 4 of an anti-adhesive product which facilitates demoulding. The anti-adhesive product is for example a layer of liquid silicon or any other oil, for example squalane, having the same adhesive properties. This may also be a layer of polytetrafluoroethylene powder (Teflon). In the case of a glass mould 2, this may be a film of gold.

Layer 4 is a very fine film, of constant thickness, which exactly follows the geometrical shape of the surface 3.

On the film 4 is deposited a peelable, hard, uniform protective layer 5 which is intended to avoid abrasion of the demoulding film 4 and the geometrical surface 3 during the operations of positioning and vibration of the substrate. Layer 5 is for example a layer of polymerizable resin which is cast in the liquid state before polymerization or in the dissolved state in a solvent for example a layer of polyvinyl, polyester, or ethylene glycol terephthalic acid ester.

Layer 5 may be constituted by a film of plastics material which is stretched over film 4.

Layer 5 has a certain thickness, with the result that the upper face of the layer 5 does not exactly reproduce the precise geometrical shape of face 3. Above the protective layer 5, a substrate 6 of resin concrete is cast, composed of aggregates coated in a polymerizable resin. The resin chosen is preferably fairly fluid before polymerization and it has a low coefficient of shrinkage during hardening, for example a polyester or epoxy resin.

The proportion of resin used for manufacturing the substrate 6 is such that the resin fills all the gaps between the grains of aggregates of the resin concrete.

The aggregates used for manufacturing the resin concrete may be crushed mineral aggregates (quartz, granite, limestone,), crushed glass, crushed ceramics, or metal grains.

The nature of the granulates is chosen as a function of the applications. Materials having a low coefficient of expansion, a low density and a good coefficient of heat conduction are preferably used.

Fiber reinforcements may advantageously be incorporated in the resin concrete, such as glass fibers, carbon fibers, organic or synthetic fibers, in order to improve the mechanical resistance to traction.

The aggregates may be constituted by hollow balls, for example hollow glass balls of different sizes.

The substrates 6 may be lightened by cavities. Similarly, channels may be formed during casting in the mass of the substrate 6, in which a liquid may be made to circulate, making it possible to maintain the temperature of the substrate constant when the mirror is being used.

Manufacture of the substrate 6 by moulding in resin concrete makes it possible easily to reserve cavities or channels in the substrate.

Cement glues are known which are mixed binding agents composed partly of resin and partly of cement.

In order to make the substrates 6 according to the invention, the resin may be replaced by such a mixed binding agent based on resin and cement.

The granulometric distribution of the aggregates composing the resin concrete must be chosen so that the mixture, after vibration, has the highest apparent density possible, in order that the proportion of gap between the grains of aggregates is as low as possible. This result is obtained by choosing a granulometric distribution of the aggregates which is a function of the nature of these aggregates and of the type of crushing thereof. According to one feature of the invention, this distribution follows a law which is set forth hereinafter.

The aggregates are distributed in granulometric classes which are defined by the dimensions of the meshes of a series of sieves which increase in a geometrical progression of ratio 2, i.e. each class of granulometry corresponds to the grains which pass through a sieve whose meshes have a dimension d and which are retained on the following sieve whose meshes have a dimension d/2.

The higher class is firstly chosen which comprises grains whose dimensions are less than a value D and more than D/2, D being approximately equal to one tenth of the smallest dimension of the substrates 6 to be manufactured, which is generally the thickness. In this way, for a mirror of 300 mm diameter, whose minimum thickness is of the order of 40 mm, granulates are chosen of which the largest grains pass through a sieve whose meshes have a width of 4 mm. Granulates are chosen of which about half of the grains are included in the higher class, i.e. between D and D/2. The other half of the aggregates is distributed in about 10 lower classes of granulometry in accordance with a law of logarithmic distribution.

Let y be the proportion of aggregates expressed in percentage of the total weight of aggregates included in one class of granulometry.

Let d be the mesh width which constitutes the upper limit of a class of granulometry which is composed of aggregates which pass to the sieve having a mesh width d and which are retained on the sieve having a mesh width d/2.

The proportion y is chosen of aggregates passing through the meshes of a sieve of dimension d, in accordance with a law of logarithmic distribution of the form $\log y = b\ 1/m \log d$ or $y = k^m\sqrt{d}$, m being a constant which depends on the nature of the materials and on the type of crushing and which is included between 3 and 6.

FIG. 4 represents a numbered example of a curve of granulometric distribution of crushed mineral aggregates intended to manufacture substrates of mirrors having a minimum thickness of 40 m/m. In this example, the largest grains of the granulate pass through a sieve of which the opening is equal to 4 mm. The coefficient m is equal to 4.5.

Let d be the opening of the mesh which defines the upper limit of each class, FIG. 4 shows on the x-axis, on the lower line, the values of d in m/m and on the upper line, the corresponding values of $^m\sqrt{d}$ for m=4.5. Curve 4 represents on the y-axis the proportion by weight of aggregates in each class and the accumulated proportion of aggregates y less than a dimension d.

The granulometric curve is composed of two straight portions.

A first portion C1 connects point y=50% d=$^m\sqrt{2}$ to point y=100% d=$^m\sqrt{4}$.

The openings of the meshes which define the upper limit of each class decrease according to the geometrical progression of ratio ½ hereinafter: 4, 2, 1, 0.5, 0.25; 0.125; 0.06; 0.03; 0.015; 0.006 and 0.003.

The proportions by weight of aggregates in each class correspond to the points located on a second portion of straight line C2 joining point 0, $^m\sqrt{0.003}$ to point 50%, $^m\sqrt{2}$.

In this example, the theoretical numerical values of the proportions in each class are given in the following table:

| Proportion | Granulometric class defined by the widths of mesh |
|---|---|
| 50% | 2 to 4 mm |
| 8% | 1 to 2 mm |
| 7% | 0.5 to 1 mm |
| 7% | 0.25 to 0.5 mm |
| 6% | 1.125 to 0.25 mm |
| 6% | 0.06 to 0.125 mm |

| Proportion | Granulometric class defined by the widths of mesh |
|---|---|
| 5% | 0.03 to 0.06 mm |
| 4% | 0.015 to 0.03 mm |
| 4% | 0.006 to 0.015 mm |
| 3% | 0.003 to 0.006 mm |

The effective granulometric distribution may of course vary slightly, of the order of ±1 to 2% of the theoretical proportions without the final result being substantially modified.

After having carefully dosed the granulates, substantially respecting the theoretical proportions by weight in each class, the aggregates are mixed and a quantity of liquid resin is incorporated in the mixture which is measured to correspond exactly, or with a slight excess, to the volume of gap between the grains. This volume is calculated from a comparison between the apparent density of the mixture and the real density of the material of which the aggregates are composed.

After having prepared the resin concrete, it is cast in a mould 1 in order to make the substrate 6; it is vibrated, for example by means of a vibrating table on which the mould 1 is placed and it is left to harden.

After which demoulding is easily effected thanks to the layer 4 of demoulding product which facilitates separation between layer 5 and the mould bottom 2 of which the geometrical surface 3 has been protected during the whole operation by layer 5 so that the state of the polished surface 3 remains perfect and the mould 2 may be re-used a large number of times in order to cast new substrates.

After demoulding of the substrate 6, the protective layer 5 may be removed from the surface 7 of the substrate either by peeling it or by means of a solvent.

In a variant, the protective layer 5 may be a layer of polymerizable resin which is left in place on the surface of the substrate.

Figure 2:
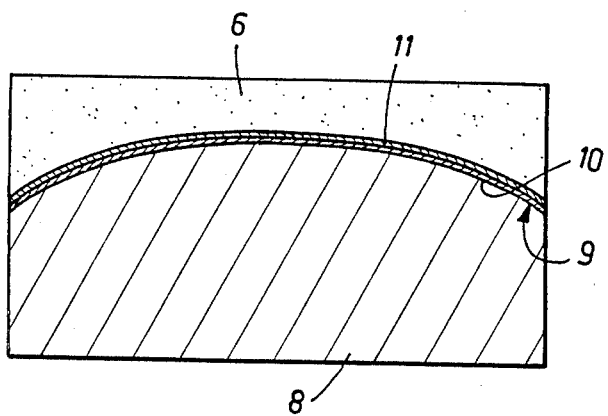
FIG. 2 is an axial section showing the step of manufacture of the superficial layer by surface replication.

FIG. 2 shows the second phase of the process during which a layer of polymerizable resin is applied on the surface 7 of the substrate or on the layer 5 left in place, by the known technique of surface replication which is the technique described for example in Pat. No. FR. 1.187.363 (F. SCHWARTZ-KINO).

According to this technique, a mould 8 is used which is for example a glass mould or one made of any other material easy to polish, which mould comprises a surface 9 which has a shape conjugate or complementary of the reflecting surface to be obtained. The surface 9 is polished according to the traditional technique of manufacture of astronomical mirrors.

In a variant, mould 2 may be used in place of mould in the course of this second phase.

Figure 3:
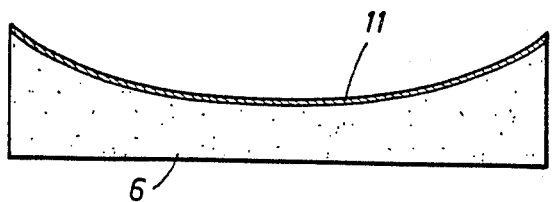
FIG. 3 is an axial section of a mirror obtained by a process according to the invention.

The surface 9 of mould 8 is uniformly coated with a demoulding layer 10. After which a thin layer 11 of polymerizable resin is applied on the demoulding layer 10. Before this resin has hardened, the substrate 6 is applied thereon and the layer of resin 11 which follows the shape of the surface 9 is left to harden. After drying, demoulding is easily effected thanks to layer 10 and a mirror shown in FIG. 3 is obtained, which comprises a substrate 6 made of resin concrete and a surface layer 11 of resin, of which the outer face presents a geometrical shape which is conjugate or complementary of the surface 9 of mould 8 and which represents the same geometrical precision as it.

In a variant, the finished mirror may comprise a layer of resin 5 interposed between substrate 6 and the terminal layer 11. A reflecting metal film is then applied on the layer 11 by one of the numerous processes known, for example by metallization in vacuo, by chemical reduction of a metal salt, or by galvanoplasty.

The polymerizable resin which constitutes layer 11 is advantageously the same as the resin of the resin concrete of substrate 6 and as that which constitutes the protecting layer 5, with the result that a very good adherence is obtained between layer 11 and substrate 6 or between layer 11, layer 5 and substrate 6.

The process according to the invention makes it possible to produce a mirror of 50 cm aperture $\lambda/10$ quality in about two weeks during which the effective work is only 3 to 4 days, the rest of the time being dedicated to awaiting polymerization of the resin. The cost price of such a mirror is of the order of a tenth of that of a conventional mirror of the same quality in glass.

We claim:

1. An astronomic mirror composed of a substrate in a resin concrete made of aggregates and of a polymerizable resin, which substrate has an outer face which approximately reproduces the optical surface of the mirror, which face bears a layer of polymerizable resin which has been hardened between a face of a mould complementary of the optical surface of the mirror and said outer face of said substrate so that there is a very good adherence between said layer and said substrate and the outer face of this layer is coated with a reflective film, wherein the granulometric distribution of said aggregates is substantially as follows:

about half of the weight of the aggregates has a size between an upper limit defined by a mesh width which is of the order of one-tenth of the smallest dimension of the mirror to be made and a lower limit defined by a mesh width equal to half the upper limit and the other half of the weight of the aggregates is composed of aggregates which are distributed in about ten granulometric classes defined by the meshes of a series of sieves which increase in geometrical progression of ratio two and the proportion in weight of aggregates (y) which passes through a sieve having a mesh opening (d) varies in accordance with a law of logarithmic distribution of the form $\log y = 1/m \cdot \log d$, in which m is a constant included between 3 and 6 and log y and log d are respective logarithms of the proportion in weight of aggregates (y) and of the mesh opening (d).

2. Process for manufacturing a mirror of astronomical quality comprising the following steps:

a mould is manufactured of which the bottom has a polished upper face complementary of the reflecting face of the mirror to be made;

said polished face is coated with a film of an anti-adhesive product and a hard, thin, uniform layer is deposited on said film;

a rigid mirror substrate is made by casting a resin concrete in said mould and by demoulding it after hardening;

said hard layer is removed from said mirror substrate after having demoulded this latter;

a film of an anti-adhesive product is deposited on the polished face of a mould complementary of the reflecting face of the mirror to be made;

a layer of liquid polymerizable resin is deposited on said film;

before said polymerizable resin layer has hardened, the face of said mirror substrate which was in contact with said hard layer is applied against said polymerizable resin layer;

said polymerizable resin is left to harden; and said substrate mirror bearing said polymerizable resin layer is demoulded and a reflecting film is applied on the outer face of said layer of resin.

3. Process for manufacturing a mirror of astronomical quality comprising the following steps:

a mould is manufactured of which the bottom has a polished upper face complementary of the reflecting face of the mirror to be made;

said polished face is coated with a film of an anti-adhesive product and a hard, thin, uniform layer is deposited on said film;

a rigid mirror substrate is made by casting a resin concrete in said mould and by demoulding it after hardening;

said hard layer is a layer of polymerizable resin which remains in place after demoulding said mirror substrate;

a film of an anti-adhesive product is deposited on the polished face of a mould complementary of the reflecting face of the mirror to be made;

a layer of liquid polymerizable resin is deposited on said film;

before said polymerizable resin layer has hardened, the face of said mirror substrate coated with said hard layer is applied against said polymerizable resin layer;

said polymerizable resin is left to harden; and said substrate mirror bearing said polymerizable resin layer is demoulded and a reflecting film is applied on the outer face of said polymerizable resin layer.

* * * * *